W. G. SHELTON.
TORPEDO CONTROLLING MECHANISM.
APPLICATION FILED AUG. 29, 1918.
1,346,264.
Patented July 13, 1920.
2 SHEETS—SHEET 1.
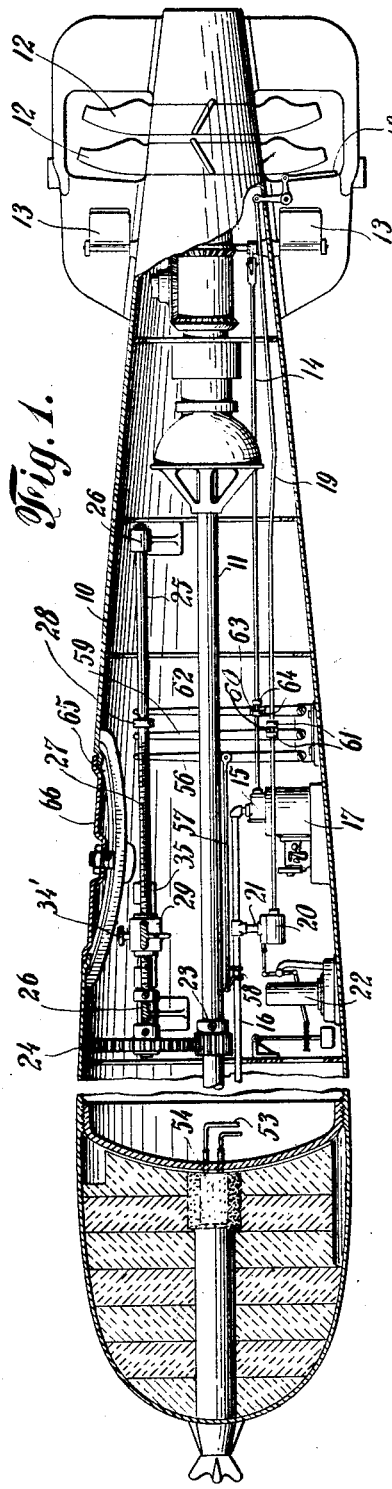
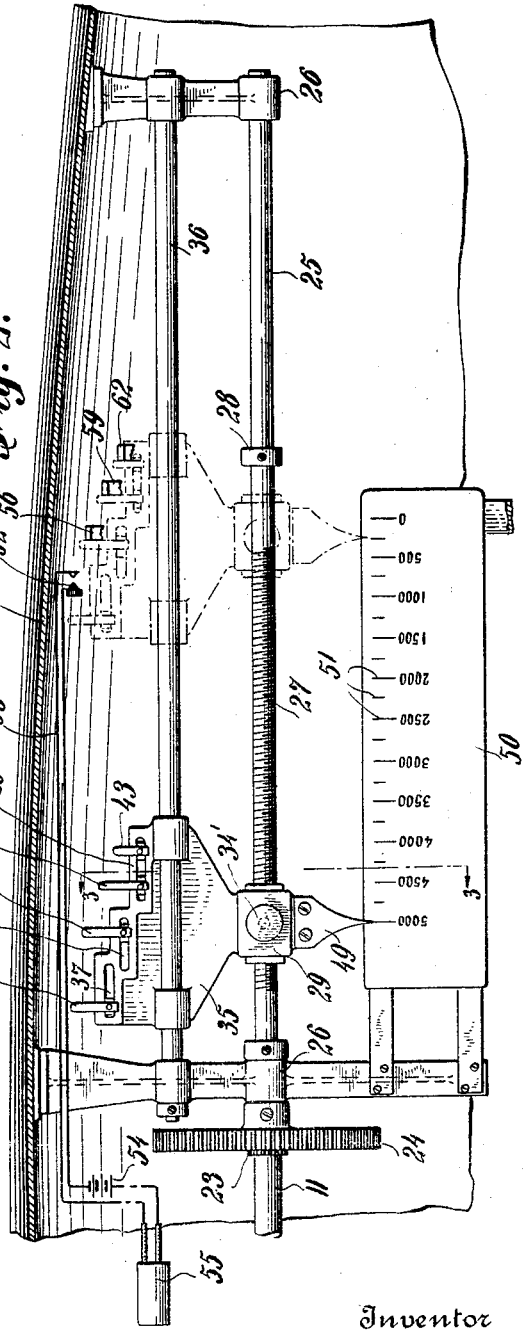
Inventor
William G. Shelton.
BY Conrad A. Dieterich
his ATTORNEY W. G. SHELTON.
TORPEDO CONTROLLING MECHANISM.
APPLICATION FILED AUG. 29, 1918.
1,346,264.
Patented July 13, 1920.
2 SHEETS—SHEET 2.
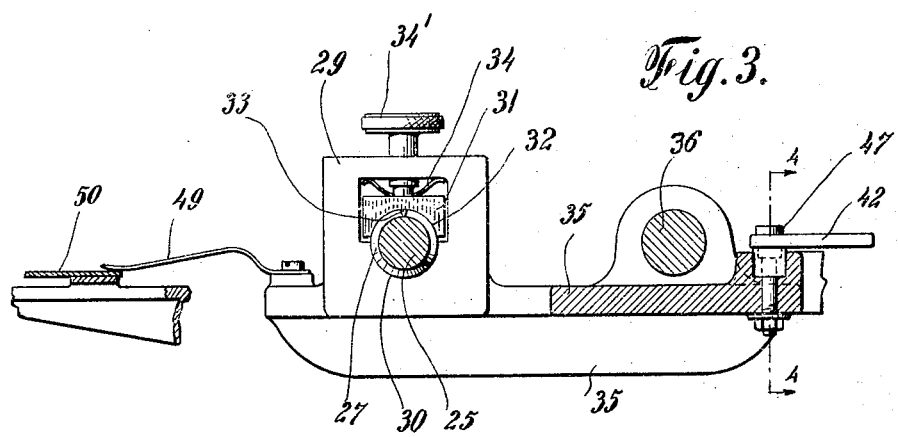
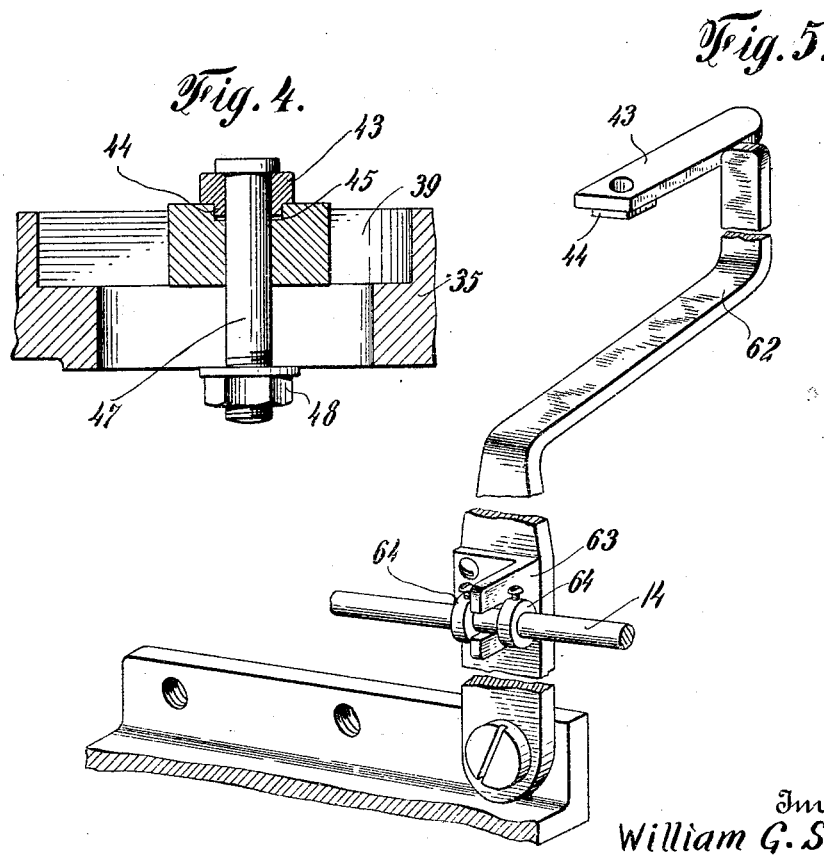
Inventor
William G. Shelton.
BY Conrad A. Dieterich
his ATTORNEY.

UNITED STATES PATENT OFFICE.

WILLIAM G. SHELTON, OF NEW YORK, N. Y.

TORPEDO-CONTROLLING MECHANISM.

1,346,264.  Specification of Letters Patent.  Patented July 13, 1920.

Application filed August 29, 1918. Serial No. 251,932.

*To all whom it may concern:*

Be it known that I, WILLIAM G. SHELTON, a citizen of the United States, residing at the city of New York, borough of Manhattan, in the county and State of New York, have invented certain new and useful Improvements in Torpedo-Controlling Mechanisms, of which the following is a full, clear, and exact specification.

This invention relates to torpedo controlling mechanisms and has for its object to provide mechanism for controlling the operation and action of a torpedo after the same has traveled a predetermined distance from its point of discharge.

Further said invention has for its object to provide means for changing the direction of travel of a torpedo after it has traveled a predetermined distance.

Further said invention has for its object to provide means for varying the depth at which a torpedo travels at a predetermined distance after it has been discharged.

Further said invention has for its object to cause a torpedo to make a spiral dive at a predetermined point in its travel.

Further said invention has for its object to provide means for exploding the charge in the war head of a torpedo when the torpedo reaches a predetermined position.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side elevation partly broken away showing a torpedo equipped with one form of controlling mechanism constructed according to and embodying my said invention;

Fig. 2 is an enlarged detail plan of the operating mechanism;

Fig. 3 is a transverse section on the line 3—3 of Fig. 2;

Fig. 4 is an enlarged detail transverse section on the line 4—4 of Fig. 3, and

Fig. 5 is an enlarged detail perspective view showing one of the operating levers and its associated parts.

Referring to the drawing, 10 indicates the casing of a torpedo, which may be of any approved type. Rotatably supported within the casing 10 is a propeller shaft 11, adapted to be driven by a suitable engine, not shown, and provided at its rear end with propellers 12, 12. 13, 13 indicate vertical or steering rudders operatively connected to one end of a reciprocatable rod 14, the other end of which is operatively connected to the piston of a fluid operated motor 15 adapted to receive fluid under pressure through a pipe 16 communicating with the motor 15 and with a suitable source of fluid under pressure, not shown. The movement of the valve of the motor 15 is controlled by the usual gyroscopic mechanism inclosed within a casing 17 positioned within the casing 10. 18 indicates a horizontal or diving rudder which is operatively connected to one end of a reciprocatable rod 19, the other end of which is operatively connected to the piston of a fluid operated motor 20 adapted to receive fluid under pressure through a pipe 21 communicating with the pipe 16 which leads to the source of supply of fluid under pressure. The movement of the valve of the motor 20 is controlled by the usual hydrostatically operated mechanism, indicated at 22. The parts thus far described are old and well known in connection with the construction of torpedoes and detailed illustration thereof is therefore unnecessary.

Secured to the propeller shaft 11 is a pinion 23 meshing with a gear wheel 24 fixed to a shaft 25 extending parallel with the propeller shaft 11 and rotatably supported within bearings 26, 26, positioned within the casing 10. Throughout a portion of its length, the shaft 25 is threaded, as indicated at 27, and secured to the shaft 25, at a suitable distance from the end of the threaded portion 27 thereof, is a collar 28.

Co-acting with the threaded portion 27 of the shaft 25, is a traveling member which is shown as consisting of a hollow block 29 having a semi-circular recess 30 in its lower portion adapted to partially embrace the shaft 27. Within the hollow block 29 is positioned a movable block 31 provided in its under surface with a semi-circular recess 32, registering with the semi-circular recess 30, and carrying a pin 33 adapted to engage the thread 27 of the shaft 25. The movable block 31 is normally maintained in its operative position, with the pin 33 engaging the thread 27 of the shaft 25, by a spring 34 interposed between the movable block 31 and the upper wall of the hollow block 29, whereby, as the shaft 25 is rotated the traveling member 29, 31, will move along the shaft 25. A headed stud 34', secured to the movable block 31 and extending through the upper wall of the hollow block 29, is provided in order that the block 31 may be raised to carry the pin 33 out of engagement with the thread 27 to permit the traveling member 29, 31, to be readily and quickly adjusted relatively to the threaded portion 27 of the shaft 25, for a purpose hereinafter described.

Connected to the traveling member 29, 31 is a carriage 35 slidably mounted upon a rod 36 supported within the casing 10 adjacent the shaft 25 and parallel thereto. The carriage 35 is provided with a plurality of longitudinally-extending recessed slots 37, 38 and 39, preferably arranged in stepped relation to one another as shown. Adjustably supported within the slots 37, 38 and 39 are a plurality of actuating members comprising arms 40, 41, 42 and 43. As the several actuating members are similar in construction and are similarly mounted within the several slots 37, 38 and 39, the construction of but one of them, for example, the one comprising the arm 43, will be shown and described in detail. At its inner end the arm 43 is provided with a squared portion 44 adapted to engage a squared recess 45 formed in a block 46 mounted within the recessed slot 39. Extending through the inner end of the arm 43, and through the block 46 and the slot 39, is a bolt 47 provided with a clamping nut 48, by means of which the arm 43 and the block 46 are held in their adjusted positions. By slightly loosening the nut 48 the block 46 carrying the arm 43 may be moved lengthwise of the slot 39 whereby the position of the arm 43 relative to the slot 39 may be varied. Upon a further loosening of the nut 48 the arm 43 may be raised to carry the squared portion 44 thereof out of engagement with the recess 45 in the block 46 whereupon the arm 43 may be turned about the bolt 47 through an angle of ninety degrees and then lowered to permit the squared portion 44 to engage the recess 45, after which the nut 48 is tightened to hold the arm 43 in its adjusted position. This arrangement permits the arm 43 to be set in its operative position, at right angles to the slot 39 and extending outwardly beyond the carriage 35, or to be set in its inoperative position, in which it will be parallel with the slot 39 and will not extend beyond the carriage 35. As the other arms 40, 41 and 42, are similarly supported it will be understood that each of them may be adjusted longitudinally of the carriage 35 and that each of them may be held in its operative or inoperative position as desired.

The traveling member 29, 31 carries a pointer 49 adapted to co-act with a scale 50 provided with graduations 51 corresponding to the distance through which the torpedo travels, the ratio between the pinion 23 and the gear wheel 24, and the pitch of the threads of the threaded portion 27 of the shaft 25 being so arranged that the movement of the traveling member 29, 31, will be proportioned to the travel of the torpedo. As shown, the graduations 51 on the scale 50 indicate yards, and by setting the traveling member 29, 31, with the pointer 49 carried thereby in register with any one of the marks on the scale 50, the traveling member 29, 31, and the carriage 35 will have been moved to the end of thread 27, at which point their movement is stopped by the collar 28, when the torpedo has traveled a distance equal to the number of yards corresponding to the mark at which the pointer 49 was set.

As the carriage 35 reaches the end of its movement the arms 40, 41, 42, and 43, carried thereby, if in their operative positions, will engage and actuate certain devices by means of which the action of the torpedo will be controlled. The arm 40 will close the normally open contact 52 of an electric circuit 53 containing an electric battery 54 and an electrical operated ignition device 55 of any suitable type, operatively associated with the war head of the torpedo and adapted to explode the explosive charge contained therein. The arm 41 will engage and actuate a lever 56 connected by a link 57 with a valve 58 located in the supply pipe 16 in advance of the supply pipe 21. This valve 58 is of the type that, when closed to shut off the flow of fluid through the pipes 16 and 21, will place the cylinders of the motors 15 and 20 in communication with the atmosphere, whereby to permit the escape therefrom of any fluid which may be contained therein. The arm 42 will engage and actuate a pivoted lever 59 operatively connected to the diving rudder controlling rod 19 in any suitable manner, as, for example, by having a forked portion 60 embracing the rod 19 and extending between two collars 61, 61, secured thereto. The arm 43 will engage and actuate a pivoted lever 62 operatively connected to the steering rudder controlling rod 14, as by means of a forked portion 63 embracing the bar 14 and extending between two collars 64, 64, secured thereto.

When the several arms 41, 42 and 43 are in their operative positions, they are so arranged, with respect to the devices actuated thereby, that the arm 41 will actuate its associated lever 56 to cut off the fluid supply before the arms 42 and 43 actuate their associated levers 59 and 62 respectively, in order that the supply of fluid under pressure will be cut off and the pressure within the cylinders of the motors 15 and 20 will be relieved, before the rudder controlling rods 19 and 14 will be actuated by the levers 59 and 62 respectively. The arm 40 is preferably so arranged that it will close the contact 52 and explode the charge within the war head, at a suitable predetermined time after the steering rudders 13, 13 and the diving rudder 18 have been actuated, by means of the arms 42 and 43, and the levers 59 and 62 respectively, to cause the torpedo to make a spiral dive.

The casing 10 is provided with a suitable opening 65 provided with a water-tight cover plate 66 which may be removed when it is desired to have access to the traveling member 29, 31 when it is desired to set the same at any point of the scale 51, as hereinbefore described.

The operation is as follows:—

Assuming that it is desired to cause the torpedo to make a spiral dive, after it has traveled five thousand yards, the traveling member 29, 31, and carriage 35 are so set that the pointer 49 registers with the graduation mark 51 in the scale 50 which is designated by the number 5000. The torpedo is then discharged and it will travel for five thousand yards, during which distance it will be controlled in its movement by the hydrostatic mechanism 22 and the gyroscopic mechanism 17 in the usual manner. As the torpedo reaches the end of its travel of five thousand yards, the arm 41 will actuate the lever 56 to close the valve 58, and the arms 42 and 43 will actuate the levers 59 and 62 to move rods 19 and 14 and the rudders 18 and 13 to cause the torpedo to make a spiral dive. As the hydrostatic mechanism 22 and the gyroscopic mechanism 17 have been rendered inoperative by the closing of the valve 58, they will no longer serve to control the movement of the torpedo. The arm 40 will then close the contact 52 of the electric circuit 53 and the charge within the war head will be exploded.

It will of course be understood that, by adjusting the several arms 40, 41, 42 and 43 relative to the carriage, the various devices actuated by the arms may be operated in sequence, or two or more of them may be operated substantially simultaneously, as desired.

It will also be understood that the arms 40, 41, 42 and 43, or any of them, may be moved into their inoperative positions, as above described, before the torpedo is discharged. If all of the arms are rendered inoperative, the torpedo will operate in the usual manner, and the charge within the war head will be exploded only when the torpedo strikes an object. If the arms 41, 42 and 43 are rendered inoperative, the charge in the war head will be exploded after the torpedo has traveled the predetermined distance, but the torpedo will travel in a straight course and at its usual depth. If the arm 42 or the arm 43 is rendered inoperative, the torpedo will either travel in a circle at a uniform depth, or else dive without circling, after it has traveled the predetermined distance, depending upon which one of these two arms has been rendered inoperative, and the charge within the war head will be exploded.

Having thus described my said invention what I claim and desire to secure by Letters Patent is:—

1. A torpedo comprising propelling means, a steering rudder, a diving rudder, and means controlled by said propelling means to actuate either one of said rudders upon the torpedo traveling a predetermined distance, substantially as specified.

2. A torpedo comprising propelling means, a steering rudder, a diving rudder, and means controlled by said propelling means to actuate said rudders upon the torpedo traveling a predetermined distance, substantially as specified.

3. A torpedo comprising propelling means, a rudder, a bodily movable traveling member actuated by said propelling means, and means controlled by said traveling member to actuate said rudder upon the torpedo traveling a predetermined distance, substantially as specified.

4. A torpedo comprising propelling means, a steering rudder, a diving rudder, a movable member actuated by said propelling means, and means controlled by said movable member to actuate either one of said rudders upon the torpedo traveling a predetermined distance, substantially as specified.

5. A torpedo comprising propelling means, a steering rudder, a diving rudder, a movable member actuated by said propelling means, and means controlled by said movable member to actuate either one or both of said rudders upon the torpedo traveling a predetermined distance, substantially as specified.

6. A torpedo comprising propelling means, a rudder, a rod operatively connected to said rudder, and a movable member actuated by said propelling means and adapted to move said rod to actuate said rudder upon the torpedo traveling a predetermined distance, substantially as specified.

7. A torpedo comprising propelling means, a steering rudder, a rod operatively connected thereto, a diving rudder, a rod operatively connected thereto, and a movable member actuated by said propelling means and adapted to move either one of said rods upon the torpedo traveling a predetermined distance, substantially as specified.

8. A torpedo comprising propelling means, a steering rudder, a rod operatively connected thereto, a diving rudder, a rod operatively connected thereto, and a movable member actuated by said propelling means and adapted to move either one or both of said rods upon the torpedo traveling a predetermined distance, substantially as specified.

9. A torpedo comprising propelling means, a rudder, a threaded shaft adapted to be rotated by said propelling means, a member co-acting with said threaded shaft and adapted to be moved longitudinally thereof as said shaft rotates, and means controlled by said movable member to actuate said rudder upon the torpedo traveling a predetermined distance, substantially as specified.

10. A torpedo comprising propelling means, a rudder, a rod operatively connected thereto, a rod-actuating member, a threaded shaft adapted to be rotated by said propelling means, and means co-acting with said threaded shaft and adapted to be moved longitudinally thereof as said shaft rotates to operate said rod-actuating member, upon the torpedo traveling a predetermined distance, whereby said rudder will be actuated, substantially as specified.

11. A torpedo comprising propelling means, a steering rudder, a diving rudder, rods operatively connected to said rudders, rod-actuating members operatively connected by said rods, a threaded shaft adapted to be rotated by said propelling means, and means co-acting with said threaded shaft and adapted to be moved by the rotation thereof to operate either one or both of said rod-actuating members, upon the torpedo traveling a predetermined distance, whereby one or both of said rudders will be actuated, substantially as specified.

12. A torpedo comprising means to alter its movement, fluid operated means to control the said movement altering means, and means to cut off the supply of fluid to said fluid operated means and to actuate said movement altering means, substantially as specified.

13. A torpedo comprising a rudder, an actuating rod operatively connected to said rudder, fluid operated means to control the movement of said actuating rod, and means to cut off the supply of fluid to said fluid operated means and to move said actuating rod, substantially as specified.

14. A torpedo comprising propelling means, a rudder, an actuating rod operatively connected to said rudder, fluid operated means to control the movement of said actuating rod, and means controlled by said propelling means to cut off the supply of fluid to said fluid operated means and to move said actuating rod, substantially as specified.

15. A torpedo comprising propelling means, a rudder, an actuating rod operatively connected to said rudder, fluid operated means to control the movement of said actuating rod, a valve to govern the supply of fluid to said fluid operated means, a lever operatively connected to said valve, a lever operatively connected to said actuating rod, and means controlled by said propelling means to actuate said levers, whereby to cut off the supply of fluid to said fluid operated means and to move said actuating rod, substantially as specified.

Signed at the city of New York, in the county and State of New York, this 23rd day of August, one thousand nine hundred and eighteen.

WILLIAM G. SHELTON.

Witnesses:
  CONRAD A. DIETERICH,
  WILLIAM P. JONES.